Patented Apr. 5, 1949

2,466,655

UNITED STATES PATENT OFFICE 2,466,655

PROCESS FOR PREPARING ENOL ACETATES

Edward F. Degering, West Lafayette, Ind., assignor to Purdue Research Foundation, La Fayette, Ind., a corporation of Indiana No Drawing. Application August 3, 1945, Serial No. 608,835

11 Claims. (Cl. 260—488)

This invention relates to a process for preparing enol acetates.

In the copending application of Bernard H. Gwynn and Edward F. Degering Serial No. 459,-448, filed September 23, 1942, now Patent No. 2,383,965 dated September 4, 1945, it is shown that enol acetates can be produced by condensing ketene with a ketone having at least three hydrogen atoms on the carbon atoms adjacent to the carbonyl group, in the presence of an acid selected from the group consisting of sulfuric acid, phosphoric acid and hydrochloric acid.

I have now found that still other acids catalyze the formation of enol acetates from ketene and ketones. It is, accordingly, an object of my invention to provide a process for preparing enol acetates. Still other objects will become apparent hereinafter.

In accordance with my invention, I prepare enol acetates by condensing ketene with a ketone having at least three hydrogen atoms on the carbon atoms adjacent to the carbonyl group, in the presence of oleum or an acid selected from those which are represented by the following general formula;

X—SO₃H wherein X represents a member selected from the group consisting of non-metallic monovalent atoms other than hydrogen, and a group containing at least 3 atoms at least one of which is a non-metallic polyvalent atom other than carbon which non-metallic polyvalent atom is linked directly to the S atom of the —SO₃H group.

In practicing my invention any oleum can be employed. Oleum, of course, is a combination of sulfur trioxide (SO₃) with sulfuric acid and the two substances combine in all proportions. Sulfuric acid containing from about 5 per cent to about 50 per cent by weight of SO₃ is advantageously employed. As acids of the above general formula, chlorosulfonic acid, fluorosulfonic acid, sulfamic acid, N-acetylsulfamic acid, N,N-dimethylsulfamic acid, methyl sulfuric acid and ethylsulfuric acid are exemplary.

As ketones having at least three hydrogen atoms on the carbon atoms adjacent to the carbonyl group the following are exemplary: acetone, methyl ethyl ketone, methyl isobutyl ketone, methyl n-amyl ketone, methyl n-hexyl ketone, diisobutyl ketone, cyclohexanone, cyclopentanone, acetophenone, mesityl oxide (methyl isobutenyl ketone), methyl n-butyl ketone, phenyl n-propyl ketone, methyl benzyl ketone, methyl furfuryl ketone, difurfuryl ketone, etc. The ketones containing at least four hydrogen atoms on the carbon atoms adjacent to the carbonyl group are especially advantageously employed in practicing my invention.

The ketene employed in practicing my invention can be prepared in any suitable manner. I prefer, however, to prepare this material by the pyrolysis of acetone. Ketene prepared in this manner will contain a small amount of acetone which is not of importance in the formation of an enol acetate from acetone. In the formation of enol acetates from ketones other than acetone, however, it is advantageous to remove as much of the contaminating acetone from the ketene as possible. This can be accomplished by passing the ketene through several cold traps in order to condense out the acetone before passing the ketene into the ketone to form an enol acetate.

In preparing enol acetates in accordance with my invention, the ketone is placed in a suitable reaction vessel along with a small quantity of the acid catalyst. The mixture is then raised to reaction temperature and ketene, preferably freshly prepared, is added to the ketone and catalyst mixture at a rate which substantially precludes the building up in the reaction mixture of any substantial quantity of unreacted ketene. The dispersion of the ketene in the reaction mixture is advantageously facilitated by agitation of the reaction mixture. Agitation also aids in avoiding local over-heating of the reaction mixture. The addition of ketene is advantageously continued until a quantity has been added which is at least as much as the molecular equivalent of the quantity of the ketone present, or until no further reaction takes place.

The process of my invention takes place over a wide temperature range. Usually I have found that the reaction takes place at an appreciable rate at from about 60° to about 90° C., although higher or lower temperatures can be employed. Especially with higher molecular weight ketones, higher temperatures should be avoided in order to avoid thermal decomposition of the ketone. The heat of reaction may require cooling of the reaction mixture to control the temperature within the desired range.

If desired, a reaction medium which is inert to the ketene and the ketone, e. g. a saturated aliphatic hydrocarbon, or an aromatic hydrocarbon of the benzene series, can be employed. However, a reaction medium is unnecessary in the case of most ketones which are liquid at the reaction temperature employed.

The following examples will serve to illustrate further the manner of practicing my invention.

*Example 1.—4-acetoxy-2,6-dimethylheptene-3*

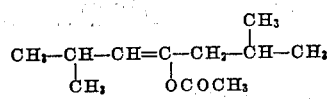

Ketene prepared by the pyrolysis of acetone was passed through two cold traps, the first trap being surrounded by an ice-bath, and the second by a dry carbon tetrachloride-chloroform bath kept at −35 to −40° C., to remove acetone from the pryolysis gas. The acetone-free ketene was then passed into a constantly agitated mixture of 71.1 g. (0.5 mole) of diisobutyl ketone and 0.8 g. (0.007 mole) of chlorosulfonic acid contained in a reaction vessel immersed in an oil bath at a temperature of 80° C. After two hours the flow of ketene was stopped. The reaction mixture was then fractionally distilled and 3 ml. of 4-acetoxy-2,6-dimethylheptene-3, boiling at 74° C. at 12 mm. of Hg pressure, was obtained. The chlorosulfonic acid employed in this example can be replaced with molecularly equivalent amounts of oleum, sulfamic acid, fluorosulfonic acid, ethyl sulfuric acid, N-acetylsulfamic acid, etc.

*Example 2.—α-Acetoxystyrene*

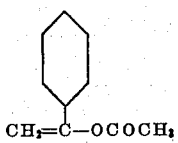

25 mil. of α-acetoxystyrene, boiling at 80 to 86° C. at 2 mm. of Hg pressure, was obtained by passing ketene into a mixture of 60 g. (0.5 mole) of acetophenone and 0.68 g. (0.007 mole) of sulfamic acid for 2 hours in accordance with the procedure set forth in Example 1. The sulfamic acid employed in this example can be replaced with oleum, N-acetylsulfamic acid, chlorosulfonic acid, fluorosulfonic acid, ethylsulfuric acid, etc.

*Example 3.—Cyclohexenyl acetate*

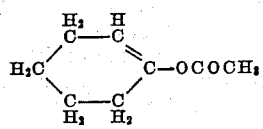

19 ml. of cyclohexenyl acetate, boiling at 90 to 100° C. at 48 mm. of Hg pressure, was obtained by passing ketene into a mixture of 49 g. (0.5 mole) of cyclohexanone and 1.0 g. of 30 per cent oleum for 2 hours at a temperature of 60 to 80° C. in accordance with the procedure set forth in Example 1. The oleum employed in this example can be replaced with sulfamic acid, N-acetylsulfamic acid, chlorosulfonic acid, fluorosulfonic acid, ethylsulfuric acid, etc.

*Example 4.—Isopropenyl acetate*

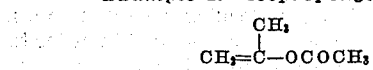

8 ml. of isopropenyl acetate, boiling at 88 to 94° C. at 750 mm. of Hg pressure, was obtained by passing ketene into a mixture of 29 g. (0.5 mole) of acetone and 1 ml. of commercial fluorosulfonic acid for two hours at 45° C. in accordance with the procedure set forth in Example 1. The fluorosulfonic acid employed in this example can be replaced with chlorosulfonic acid, oleum, sulfamic acid, N-acetylsulfamic acid, ethylsulfuric acid, etc.

In the manner set forth in the foregoing examples, other ketones, e. g. any of the other ketones listed above, can be converted to unsaturated esters using any of the acid catalysts defined above. Small amounts of water may be present without adversely affecting the process.

The proper quantity of acid employed as catalyst in these condensations will vary with the rate of addition of the ketene, and an increased rate of addition demands a greater amount of catalyst. When operating at the most desirable rate of addition, we have found that the yield of unsaturated esters increases slowly at about the same rate as the concentration of catalyst is increased. When high concentrations of catalyst are employed, however, the ratio of polymerization of the ketene to the formation of unsaturated ester increases sharply, and the yield of unsaturated ester drops off sharply. The ketene is advantageously introduced into the ketone and catalyst mixture at the rate of about one gram-mole of ketene per hour, although higher or lower rates can be employed.

What I claim as my invention and desire to be secured by Letters Patent of the United States is:

1. In a process for the condensation of ketene with a ketone containing a single carbonyl group and having at least three hydrogen atoms on the carbon atoms adjacent to the carbonyl group to produce enol acetates, the step which comprises reacting said ketone with ketene in the presence of an acid selected from the group consisting of halosulfonic acids, oleum, alkylsulfuric acids and sulfamic acids.

2. In a process for the condensation of ketene with a ketone containing a single carbonyl group and having at least three hydrogen atoms on the carbon atoms adjacent to the carbonyl group to produce enol acetates, the step which comprises reacting said ketone with ketene in the presence of chlorosulfonic acid.

3. In a process for the condensation of ketene with a ketone containing a single carbonyl group and having at least three hydrogen atoms on the carbon atoms adjacent to the carbonyl group to produce enol acetates, the step which comprises reacting said ketone with ketene in the presence of a sulfamic acid.

4. In a process for the condensation of ketene with a ketone containing a single carbonyl group and having at least three hydrogen atoms on the carbon atoms adjacent to the carbonyl group to produce enol acetates, the step which comprises reacting said ketone with ketene in the presence of oleum.

5. In a process for the condensation of ketene with a ketone containing a single carbonyl group and having at least four hydrogen atoms on the carbon atoms adjacent to the carbonyl group to produce enol acetates, the step which comprises reacting said ketone with ketene in the presence of an acid selected from the group consisting of halosulfonic acids, oleum, alkylsulfuric acids and sulfamic acids.

6. In a process for the condensation of ketene with a ketone containing a single carbonyl group and having at least four hydrogen atoms on the carbon atoms adjacent to the carbonyl group to produce enol acetates, the step which comprises reacting said ketone with ketene in the presence of chlorosulfonic acid.

7. In a process for the condensation of ketene with a ketone containing a single carbonyl group and having at least four hydrogen atoms on the carbon atoms adjacent to the carbonyl group to produce enol acetates, the step which comprises reacting said ketone with ketene in the presence of oleum.

8. In a process for the condensation of ketene with a ketone containing a single carbonyl group and having at least four hydrogen atoms on the carbon atoms adjacent to the carbonyl group to produce enol acetates, the step which comprises reacting said ketone with ketene in the presence of a sulfamic acid.

9. In a process for the condensation of ketene with acetone to produce isopropenyl acetate, the step which comprises reacting said acetone with ketene in the presence of chlorosulfonic acid.

10. In a process for the condensation of ketene with acetone to produce isopropenyl acetate, the step which comprises reacting said acetone with ketene in the presence of oleum.

11. In a process for the condensation of ketene with acetone to produce isopropenyl acetate, the step which comprises reacting said acetone with ketene in the presence of a sulfamic acid.

EDWARD F. DEGERING.

REFERENCES CITED

The following references are of record in the file of this patent:

UNITED STATES PATENTS

| Number | Name | Date |
| --- | --- | --- |
| 2,383,965 | Gwynn et al. | Sept. 4, 1945 |
| 2,407,302 | Spence et al. | Sept. 10, 1946 |

OTHER REFERENCES

Gwynn et al., "Journ. Am. Chem. Soc.," vol. 64 (1942) pp. 2216–2218.